UNITED STATES PATENT OFFICE.

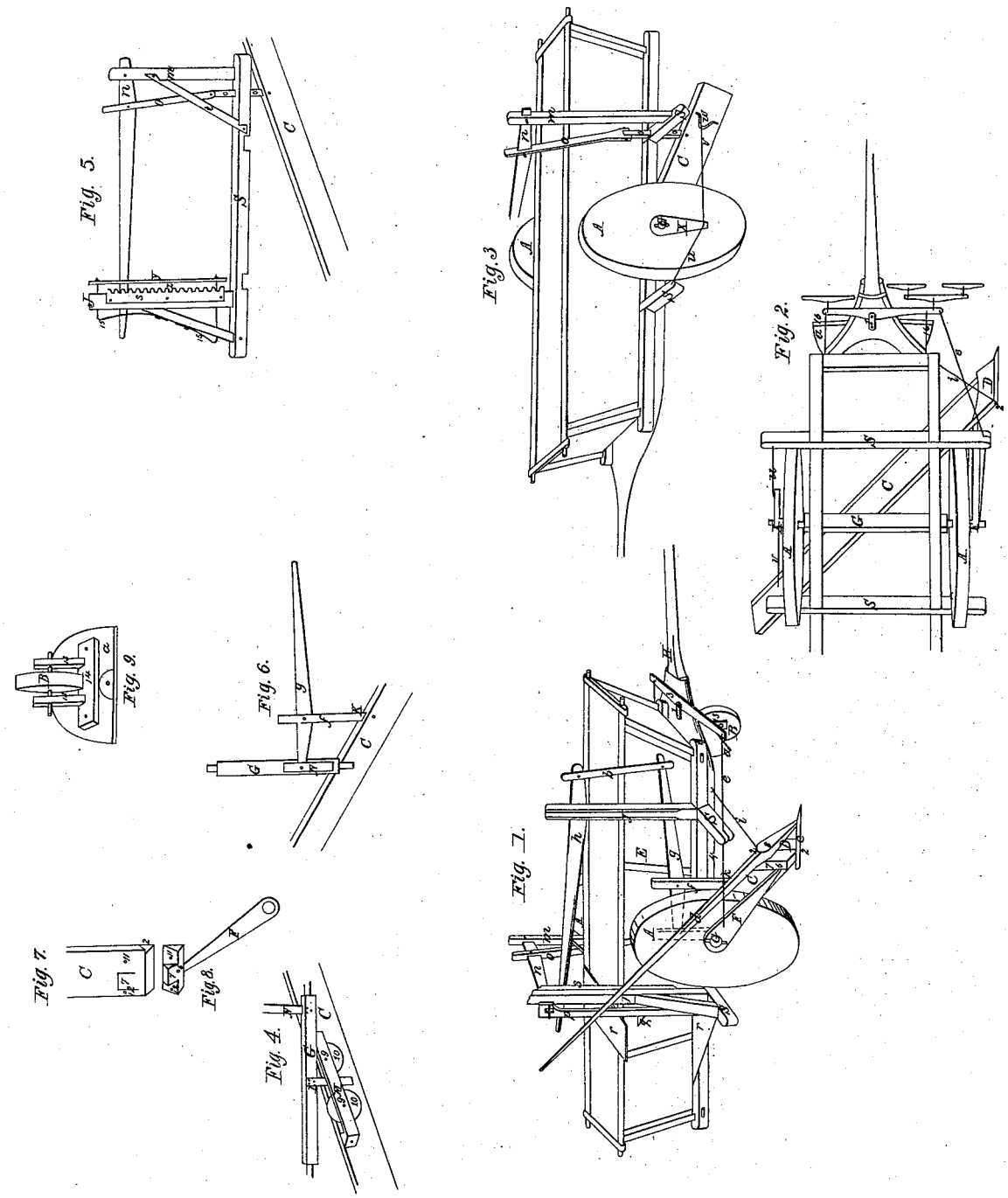
N. Perkins.
Excavator.
N° 4,917.
Patented Jan. 1, 1847.

NATHAN PARKINS, OF FREDERICK COUNTY, VIRGINIA, ASSIGNOR TO J. S. PARKINS.

EXCAVATOR FOR ROADS, &c.

Specification of Letters Patent No. 4,917, dated January 1, 1847.

*To all whom it may concern:*

Be it known that I, NATHAN PARKINS, of Frederick county and State of Virginia, have invented a new and useful machine which I term an "excavator and graduator (or scraper)" for the purpose of excavating, grading, and spreading macadamized stone and solidifying roads; and I do hereby declare that the following is a clear and exact description of the construction and operation of the same, reference being had to the annexed drawings, making a part of this specification, in which—

Figure 1 is a perspective view; Fig. 2, an elevated longitudinal and transverse view; Fig. 3, a left side elevation; Figs. 4, 5, 6, 7, 8 and 9, detached sections showing the manner of constructing different parts in combining the scraper with the cart.

To enable others skilled in the art to make and use my invention I shall proceed to describe its construction and operation.

The nature of my invention consists in having a plow fixed to the front end of the scraper placed at an angle of 40 or 45 degrees and the whole supported by a cart with two or three wheels with levers attached to the scraper in order to give the conductor full control over the plow and scraper; by which means he can with the utmost facility take the earth from the margin of the road and place it in the center, bring down prominences fill up the ruts with earth gravel or macadamized stone as the case may require. In making new grades it is particularly valuable in shaping the road, making fills openings gutters &c. The plow and scraper can be speedily detached, and then it will be a complete four horse cart (with two or three wheels) ready for any use and susceptible of being turned about in a small space and capable of bearing a full four horse load of gravel, stone or earth, and when deposited can be brought to a proper grade by the scraper and solidified by the broad wheels of the cart making a tread of 10 or 12 inches to each wheel.

I construct after this wise. First I make a cart with two or three wheels as A, A, B, in Fig. 1 of the accompanying drawings, the two wheels A, A, being four feet in diameter and one foot the tread made of wood or iron. The third or truck wheel B, having also a twelve inch tread is fixed to a semicircular vibrator $a$, through the center of motion of this passes a bolt the end of which is seen at 1. Upon the verge of the vibrator $a$ and under the hounds 4 are friction rollers to enable it to work easily as the case may require. The object of this wheel is to support the fore part of the cart and bear a weight of four or five hundred pounds and facilitate the turning about of the machine. The hounds 4 are made fast to the axle simply as cart shafts. Body E is made after the order of a cart body, is twelve feet long and is large enough to contain a four horse load. The bottom rails are let into the axle and have a bolt passing through each. The transverse sills S S are let into the bottom or longitudinal rails, their respective top surface being coincident, the ends projecting two feet beyond the sides. In these sills are framed three posts J, J and M. J to the front a fulcrum post in which plays the lever $h$. J in the rear is fixed with a spring and rack, the object of which is to enable the conductor to adjust the plow and scraper and make them fast at any degree of height or depression that the condition of the ground may require which is done by means of the lever $n$. The lever $h$ is connected with the lever $g$ by means of the stem $b$. The lever $g$ is connected to the scraper C by means of the stem $f$. Through this course of levers, with the aid of the plow handle $d$ the conductor has control over the plow. The scraper C obliques from the front of the right wheel to the rear of the left, passing under the center of the axle. The plow D has a knob 2 at its top and rear under which passes the scraper and through which passes a long bolt from 2, at the bottom and heel of the share C, which bolt passes through the scraper and through the knob of the mold-board receiving the end of the stay brace 1. It also has several other bolts through it to confine it to the scraper C, one will pass through the heel piece 7 which heel piece must be securely fixed as upon it the whole friction of the plow operates. In order to effect which I cut a square seat in the scraper immediately opposite the front end of the beam F the object of which is to place the power directly on the scraper and plow. The scraper being oblique as above described the power would have a tendency to pass oblique, it is therefore necessary to cut a seat the front line of which will be at right angles with the course of the power. The point of the beam F goes into a mortise which is in the heel piece 7, with a pin 6 to confine it there, the butt end of the beam F has a circular orifice in it and is fixed to the axle at G from this point at F passes a rod e through the sill S let into the end by a slit in the same in order that the scraper may be taken off at pleasure, and is made fast to the stationary double or triple tree 3, so that the greatest amount of draft is placed immediately upon the plow at 7. The conductor controls the rear end of the scraper by placing his foot on the foot-piece q or confines it up by means of a pin. His power is exerted through stem p, lever n and stem o. The stem o is connected to the scraper by a pin or screw bolt as seen in Fig. 3 as is also the stem f at k. The scraper C passes obliquely from the front of the right wheel to the rear of the left as before remarked and under the center of the axle at an angle of 40 degrees. To this point of the axle is fixed a downright upon which plays friction rollers which are fixed to the scraper (as seen in section 4) that the same may rise or fall with ease at the conductor's pleasure and also confine it to its proper place. H the tongue r r platforms for the conductor to stand on. A, A, Fig. 2 hind wheels, C scraper, D plow i, e 16, 16 stay rods. On the left end of the axle is a washer X placed inside of the linch pin with a stem projecting downward, to the lower end is fixed the rods u and v the rear end of the rod u is attached to the scraper C, the front end of the rod v is attached to the left end of the front transverse sill S. The advantage of this washer is in the stem that projects from it, the lower end of which is attached to the rods u and v which rods are to propel the rear end of the scraper in a more horizontal manner than it would otherwise be if drawn from the axle directly and consequently tends to keep the scraper to the ground. Fig. 3 represents the left side of the cart. Fig. 4 a section showing the manner of connecting the scraper to the axle in which G is the axle in which is fixed a downright stay L passing between the friction rollers 10, 10. The friction rollers are placed on the rear of the scraper by means of a cleat (or bar of iron) M, and work upon center pins 9, 9. f the stem connecting the scraper with lever g (Fig. 1). Lever g has its center of motion or rear end confined to the posts which is represented by the dotted lines on wheel A in Fig. 1. Fig. 5 a section showing the connection between the rear transverse sill S and the machine J and M two posts, on J is fixed the spring and rack, the rack 15 15 spring attached to the guard y. M a post holding the end of lever n. C scraper, o o o stem connecting lever n to scraper Fig. 6 section C scraper, G axle, N post to support lever g (as seen by the dotted lines on wheel in Fig. 1) f stem connecting lever g with the scraper. Figs. 7 and 8 heel piece and its seat, 7 the seat and 7 the corresponding part of the heel piece, 6 the pin to confine beam F to heel piece, 11 11 and 12 12 corresponding bolt holes. Fig. 9 an inverted view of the truck vibrator B wheel 13 13 center posts 14 a piece of timber made fast to the vibrator a for the purpose of holding the posts 13, 13.

What I claim as my invention and desire to secure by Letters Patent is—

Combining the scraper with a wheeled carriage or cart in such a manner that it may be thrown into and out of action and be regulated by an attendant upon the cart by means of the elevating and depressing levers and the scraper handles the whole being combined and operating substantially in the manner and for the purpose herein set forth, using for the construction any material that will best suit my purpose.

NATHAN PARKINS.

Witnesses:
J. T. RICH,
M. M. BRENT.